(12) United States Patent  
Merriam (10) Patent No.: US 9,277,353 B2
(45) Date of Patent: Mar. 1, 2016

(54) METHODS AND SYSTEMS FOR LOCATING PERIPHERAL DEVICES

(71) Applicant: XEROX CORPORATION, Norwalk, CT (US)

(72) Inventor: Ray Uri Merriam, Rochester, NY (US)

(73) Assignee: XEROX CORPORATION, Norwalk, CT (US)

( * ) Notice: Subject to any disclaimer, the term of this patent is extended or adjusted under 35 U.S.C. 154(b) by 102 days.

(21) Appl. No.: 13/855,196

(22) Filed: Apr. 2, 2013

(65) Prior Publication Data

US 2014/0295876 A1 Oct. 2, 2014

(51) Int. Cl.
*H04W 4/02* (2009.01)
*G06F 3/12* (2006.01)

(52) U.S. Cl.
CPC .............. *H04W 4/02* (2013.01); *G06F 3/1285* (2013.01)

(58) Field of Classification Search
None
See application file for complete search history.

(56) References Cited

U.S. PATENT DOCUMENTS

| | | | |
|---|---|---|---|
| 8,346,903 B2 | 1/2013 | Sheperd | |
| 2004/0130740 A1* | 7/2004 | Lawrence et al. | 358/1.13 |
| 2005/0108651 A1* | 5/2005 | Kitajima | H04N 1/0035 715/764 |
| 2012/0019867 A1* | 1/2012 | Prati et al. | 358/1.15 |
| 2014/0022587 A1 | 1/2014 | Coccia et al. | |
| 2014/0085664 A1* | 3/2014 | Riherd et al. | 358/1.15 |

\* cited by examiner

*Primary Examiner* — Charles Appiah
*Assistant Examiner* — Margaret G Mastrodonato
(74) *Attorney, Agent, or Firm* — MH2 Technology Law Group LLP (57) ABSTRACT

A system and method for locating peripheral devices by determining a current location of a computing device, searching for peripheral devices based on the current location of the computing device, displaying an indication of the peripheral devices based on the current location of the computing device, receiving a selected peripheral device of the peripheral devices, and transmitting information to the selected peripheral device.

16 Claims, 5 Drawing Sheets

THE FOLLOWING LOCATIONS HAVE BEEN FOUND:
- 20 USERS HAVE USED
  - UNIVERSITY PRINTER 314 ← 350
  - 100 UNIVERSITY AVE
  - DISTANCE .5 MILES
  - PRICE: $0.10 PER PAGE
  - ACCESS: 24 HOURS - 7 DAYS
- 18 USERS HAVE USED
  - SHOP PRINTER 308 ← 352
  - 220 MAIN STREET
  - DISTANCE 1 MILES
  - PRICE: $1.00 PER PAGE
  - ACCESS: 9 AM-9PM-MONDAY-FRIDAY
- 10 USERS HAVE USED
  - PRINT SHOP PRINTER 312 ← 354
  - 200 UNIVERSITY AVE
  - DISTANCE .4 MILES
  - PRICE: $0.20 PER PAGE
  - ACCESS: 9 AM-9PM-MONDAY-FRIDAY
- 3 USERS HAVE USED
  - OFFICE PRINTER 330 ← 356
  - 300 COMPANY LANE
  - DISTANCE 5.1 MILES
  - PRICE: N/A
  - ACCESS: GRANTED 24 HOURS - 7 DAYS
- 5 USERS HAVE USED
  - COFFEE SHOP PRINTER 316 ← 358
  - 140 MISSION ROAD
  - DISTANCE 4.2 MILES
  - PRICE: $0.20 PER PAGE
  - ACCESS: 6 AM-12AM-7 DAYS

RECOMMENDED — 360

METHODS AND SYSTEMS FOR LOCATING PERIPHERAL DEVICES

TECHNICAL FIELD

The present disclosure relates generally to methods, systems, and computer-readable media for finding local peripheral devices based on a current location.

BACKGROUND

Current mobile and cloud technologies can allow users to utilize shared and/or third-party peripheral devices, such as printers. For example, a user can find a printer in a new location, can connect to the printer, and can use the printer to print a document stored on a mobile computing device or stored in a cloud. However, if a user is unaware of where to find a printer in a new location, the user may not be able to print a document.

Therefore, mobile and cloud technologies can be improved by methods and systems that locate local peripheral devices based on a current location of a computing device.

SUMMARY OF THE INVENTION

The present disclosure relates generally to methods, systems, and computer readable media for providing these and other improvements to mobile and cloud technologies.

In some embodiments, a user can activate a peripheral device locator on a computing device. The computing device can determine a current location. Based on the current location, the computing device can determine one or more peripheral devices associated with and/or within a defined distance of the current location. The computing device can display information about the one or more peripheral devices for the user, and the user can select one of the one or more peripheral devices. Based on the user selection, the computing device can transmit a command to the peripheral device and/or transmit information to the peripheral device. Further, the computing device can record which peripheral device was selected by the user and utilize such information the next time a user is at or around the current location.

BRIEF DESCRIPTION OF THE DRAWINGS

The accompanying drawings, which are incorporated in and constitute a part of this specification, illustrate various embodiments of the present disclosure and together, with the description, serve to explain the principles of the present disclosure. In the drawings.

DETAILED DESCRIPTION

The following detailed description refers to the accompanying drawings. Wherever possible, the same reference numbers are used in the drawings and the following description refers to the same or similar parts. While several exemplary embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

Figure 1:
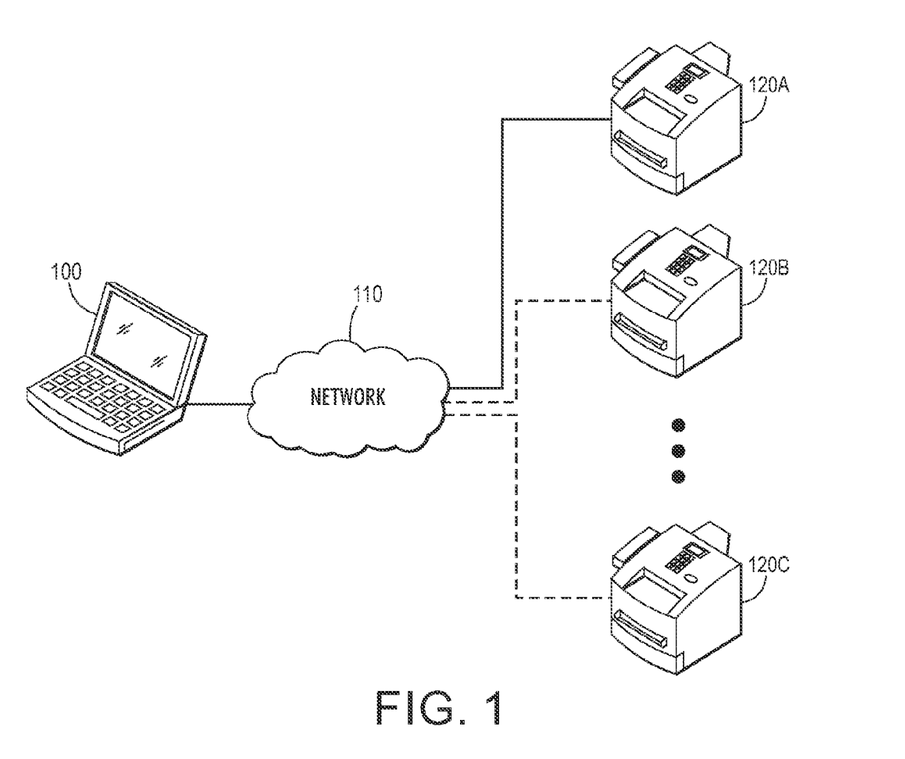
FIG. 1 is a diagram depicting an exemplary mobile print system, consistent with certain disclosed embodiments.

FIG. 1 is a diagram depicting an exemplary mobile print system, consistent with certain disclosed embodiments. As depicted in FIG. 1, device 100 can represent any type of computing device capable of communicating with peripheral devices. For example, device 100 can represent a mobile device, such as a laptop, a smart phone, a tablet computer, etc.

Device 100 can be connected to network 110. Network 110 can represent any type of communication network that allows communication between computing devices, such as device 100, and peripheral devices, such as printers. Additionally, network 110 is not limited representing a single network, and, in embodiments, network 110 can represent multiple networks. For example, network 110 can represent a wide area network (e.g. the Internet), a local area network, a telecommunications network, or a combination thereof.

As further depicted in FIG. 1, device 120A can represent a peripheral device capable of communicating with device 100. For example, device 120A can represent a peripheral device capable of printing, scanning, faxing, or a combination thereof. As used herein, a peripheral device can be any type of device that can communicate with and expand the capabilities of a computing device, but is not part of the computing device.

Device 120A can be connected to network 110, and device 120A can communicate with device 100 via network 110. For example, device 120A can transmit and/or receive image data from device 100 via network 110. Additionally, device 120A can be associated with a location, such as a physical address or Global Positioning System (GPS) coordinates.

In some embodiments, devices 120B-120Z can represent one or more alternative peripheral devices connected to network 110 and capable of communicating with device 100. Devices 120B-120Z can additionally be associated with locations.

Those skilled in the art will appreciate that the above-described system and examples are exemplary only, and any system capable of performing the embodiments disclosed herein can be utilized.

Figure 2:
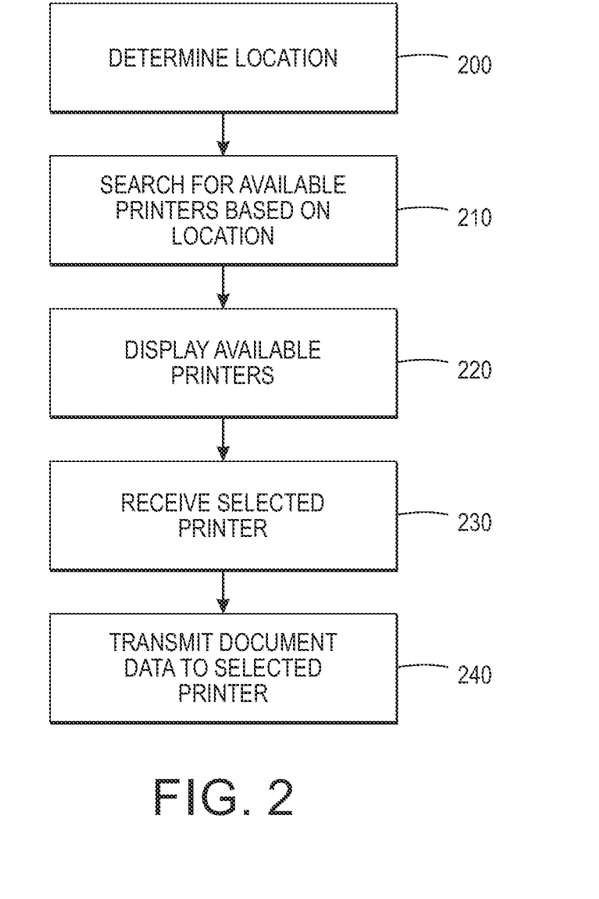
FIG. 2 is a flow diagram illustrating an exemplary method for locating peripheral devices, consistent with certain disclosed embodiments.

FIG. 2 is a flow diagram illustrating an exemplary method for locating peripheral devices, consistent with certain disclosed embodiments. FIG. 2 illustrates a method for locating and utilizing a printer, however, the described method can be used with any type of peripheral device. As used herein, a printer can refer to any device capable of outputting a representation of an electronic document on physical media (e.g. paper).

In embodiments, the process can begin when a user initiates a peripheral device finder application on a computing device. For example, the application can be initiated when a user attempts to print a document. In other embodiments, the user can indicate which type of peripheral device to locate.

In 200, the application can determine a current location of the computing device. In some implementations, the computing device can have an integrated GPS receiver, and the application can determine a current location based on signals from GPS satellites. In further implementations, the application can determine a current location based on a known location of the computing device's current access point to a computer network. For example, the computing device can be connected to a wireless router with a known location. Accordingly, the application can use a known location of the wireless router as the current location or can estimate a current location based on an estimated range of the wireless router.

In 210, the application can search for available printers based on the current location. In embodiments, the application can search a peripheral device location database that associates peripheral devices with known locations. In this example, the peripheral device location database can be a printer location database. However the concepts as explained herein can be additionally applied to a peripheral device location database.

The application can search a printer location database that associates printers with known locations and search for printers within a predetermined or selected distance range of the current location. In embodiments, the printer location database can be stored at a remote server that can be accessed via a wide area or telecommunications network. Additionally or alternatively, all or part of the printer location database can be stored locally on the computing device.

In certain implementations, the printer location database can associate further information with printers, such as, but not limited to: hours of availability, fees associated with using the printers, number of uses of the printers by all users, number of uses of the printers by users of a peripheral device finder application, network addresses for the printers, hardware addresses for the printers, access credentials for the printers, specifications of the printers, capabilities/features of the printers, etc.

In embodiments, the known locations of the printers can have been previously entered into the database by users of the system. For example, the printers can be assigned locations by system administrators. As an additional example, the printers can be associated with locations based on previous users of peripheral device finder applications. In some implementations, a user of a peripheral device finder application may be allowed to associate printers with locations, or printers can be associated with locations based on printers used by users at given locations.

In some embodiments, the printer location database can further associate printers with accessibility information. For example, printers can be fully accessible to all users, can be accessible during set hours, or can be accessible only to select users (e.g. employees of a certain company, members of a certain organization, subscribers to a certain service, etc.). Accordingly, in embodiments, the search for available printers will return a list of available printers that fall within the distance range of the current location and that are determined to be accessible to the user.

Further, in some embodiments, the list of available printers can also be limited by the capabilities of the accessible printers that fall within the distance range. For example, the user may indicate that a color printer is required, and the list of available printers may only include printers that are capable of printing in color.

In 220, the computing device can display the list of available printers. Additionally, in embodiments, the computing device can also display information about the available printers, such as, but not limited to the printer location, the distance to the printer from the current location, the hours that the printer is available, capabilities/features of the printer, and any fees associated with the printer.

In some embodiments, the list of available printers can be listed in an order based on the distance of the printer from the current location. In further embodiments, the list of available printers can be listed in an order based on a determined recommendation score for each available printer. In such embodiments, the computing device can calculate the recommendation score based on variables that include, but are not limited to the distance of the printer from the current location, any fees associated with using the printer, any fees associated with using special features of the printer (e.g. color printing), the size of the print job, and the number of uses of the printer by all users or by users of a peripheral device finder application.

In further embodiments, the application can also identify and display an indication of at least one of the available printers as a recommended printer based on, for example, the recommendation score for the printer.

In 230, the computing device can receive an indication from the user of a selected printer.

In 240, based on the indication, the computing device can send information to the selected printer using one or more communication networks and the network and/or hardware address associated with the printer in the printer location database. For example, the computing device can send an imaged document and printing parameters to the selected printer.

In some embodiments, the application may require further information from the user before sending information to the selected printer. For example, the application may require that the user indicate a document to be printed, printing parameters, access credentials for the printer, etc. In other embodiments, the computing device may use a preselected document and preselected or default printing parameters.

In certain implementations, after receiving an indication of the selected printer, the application can further associate the current location with the selected printer. For example, the application can increment a counter of uses of the selected printer and/or a counter of uses of the selected printer using a peripheral finder application in the printer location database. As an additional example, the computing device can transmit an indication that the user selected the selected printer from the current location to a central database that stores the printer location database. The central server can then increment the counter(s) based on the indication.

While the steps depicted in FIG. 2 have been described as performed in a particular order, the order described is merely exemplary, and various different sequences of steps can be performed, consistent with certain disclosed embodiments. Additional variations of steps can be utilized, consistent with certain disclosed embodiments. Further, the steps described are not intended to be exhaustive or absolute, and various steps can be inserted or removed.

Figure 3A:
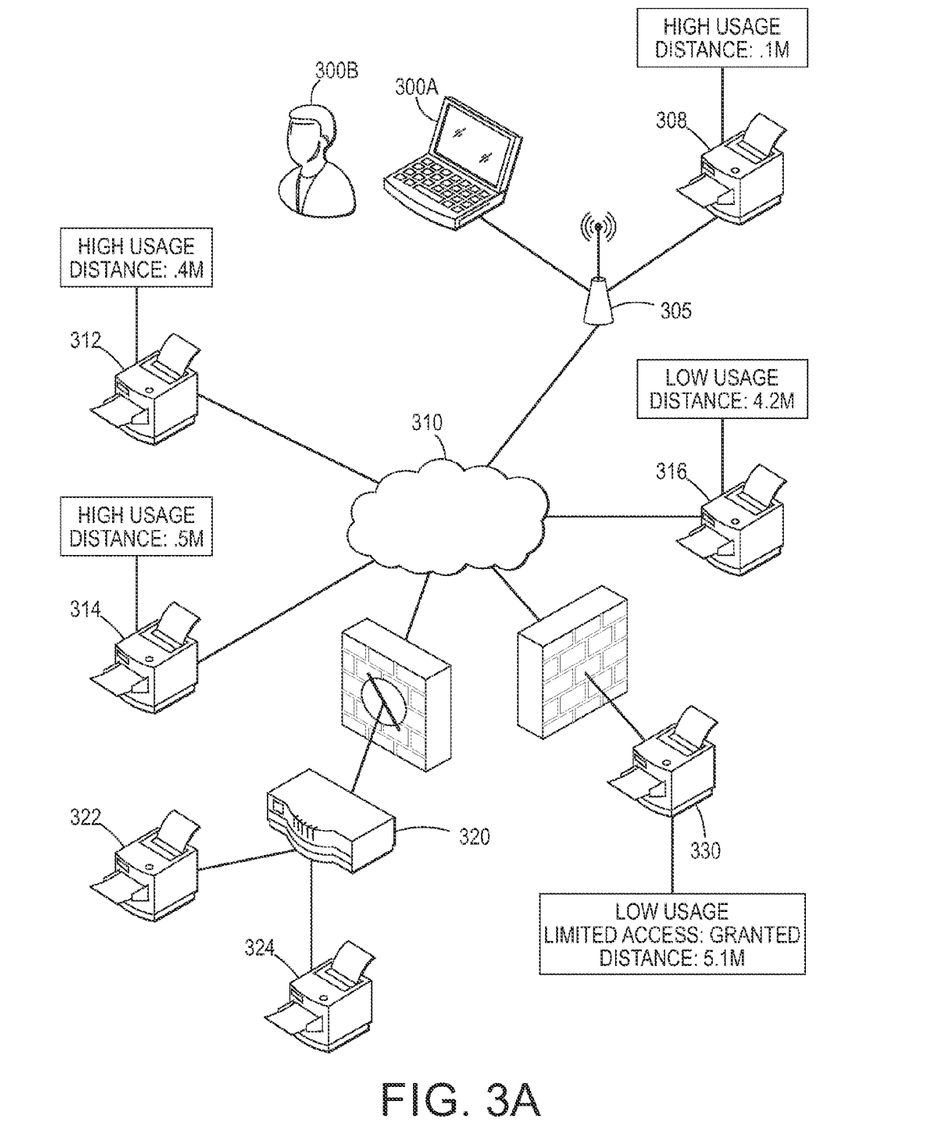
FIG. 3A is an illustrative diagram of an example situation where mobile print technologies can be utilized, consistent with certain disclosed embodiments.

FIG. 3A is an illustrative diagram of an example situation where mobile print technologies can be utilized, consistent with certain disclosed embodiments. FIG. 3A is intended merely for the purpose of illustrating the use of disclosed embodiments of mobile print technologies and is not intended to be limiting.

As depicted in FIG. 3A, device 300A can represent a computing device that is used by user 300B. For example, device 300A can be a laptop. For the sake of this example, it can be assumed that the user needs to access a printer to print a document. However, as stated above, the systems and methods as described herein can be used with any type of peripheral device. Further, it can be assumed, for the sake of example, that the user is in a new location and has never accessed any printers in the area and is unaware of the location of any printers in the area.

Device 300A is connected to wireless access point 305 via a wireless signal. Wireless access point 305 is additionally connected to printer 308 via a wireless signal. Device 300A, wireless access point 305, and printer 308 can be part of a local area network. Additionally, wireless access point 305 can be connected to wide area network 310 (e.g. the Internet), and can provide device 300A and printer 308 access to wide area network 310. For example, user 300B may be using device 300A at a shop that provides wireless internet access and printer access (e.g. printer 308) to customers.

As depicted in FIG. 3A, printer 312, printer 314, printer 316, access point 320, and printer 330 may also be connected to wide area network 310. Access point 320 is further connected to printer 322 and 324, as part of a local area network.

Printer 312, printer 314, and printer 316 are in separate locations and are publicly accessible. Printer 322 and printer 324 are in the same building, are not publicly accessible, and are not accessible to user 300B. Printer 330 is not publicly accessible but is accessible to user 300B. For example, user 300B can be an employee of a company that operates printer 330, user 300B can be a subscriber to a service that allows access to printer 330, etc.

User 300B can initiate a peripheral device finder application on device 300A by attempting to print a document. Device 300A can determine a current location, and device 300A can access a printer location database (e.g. via wide area network 310). Device 300A can search the printer location database for printers within a ten-mile radius, which can be, for example, a predetermined value, a user selected value, a default value, etc.

Based on the search, device 300A can determine that printer 308, printer 312, printer 314, printer 316, printer 322, printer 324, and printer 330 are within a ten-mile radius of the current location based on known locations of the printers. Device 300A can determine that printer 308, printer 312, printer 314, and printer 316 are publicly accessible. Additionally, device 300A can determine that printer 322, printer 324, and printer 330 are not publicly accessible, and that printer 330 is available to user 300B. Accordingly, device 300A can determine that printer 308, printer 312, printer 314, printer 316, and printer 330 are available to user 300B and device 330A.

Figure 3B:
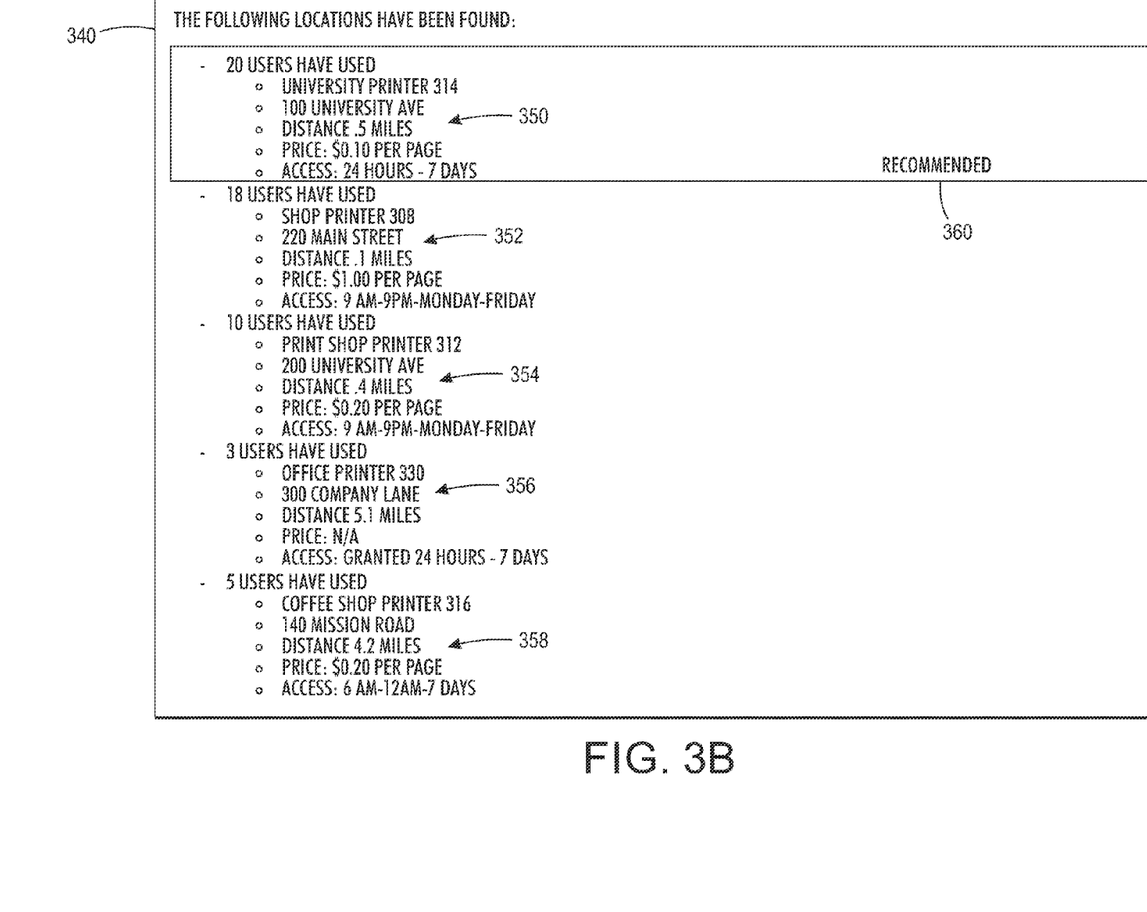
FIG. 3B is an illustrative diagram of an example output on a display screen, consistent with certain disclosed embodiments.

Based on such determinations, device 300A can display a list of all available printers within the ten-mile radius, as shown in FIG. 3B.

FIG. 3B is an illustrative diagram of an example output on a display screen, consistent with certain disclosed embodiments. FIG. 3A is intended merely for the purpose of illustrating the use of disclosed embodiments of mobile print technologies and is not intended to be limiting.

As depicted in FIG. 3B, display screen 340 can represent the display screen of device 300A displaying the list of all available printers within the ten-mile radius. In this example, the list can be organized by a determined recommendation score for each printer. The recommendation score in this example can be based on price information and distance from the current location.

Each entry on the list of printers can correspond to a printer from FIG. 3A. Entry 350 can correspond to printer 314, entry 352 can correspond to printer 308, entry 354 can correspond to printer 312, entry 356 can correspond to printer 330, and entry 358 can correspond to printer 316.

Each entry is populated with information from the printer location database, including printer location, price information, and access information. Additionally, a distance from the current location is also included in each entry.

Based on the price information and distance from the current location, device 300A can assign the highest recommendation score to entry 350 (printer 314). Accordingly, device 300A can display indicator 360 on the display screen to indicate to user 300B that entry 350 (printer 314) has the highest recommendation score.

Device 300A can subsequently receive a selected printer from user 300B and can transmit document information to the selected printer using a network address associated with the selected printer. The network address associated with the selected printer can be obtained from the printer location database.

Figure 4:
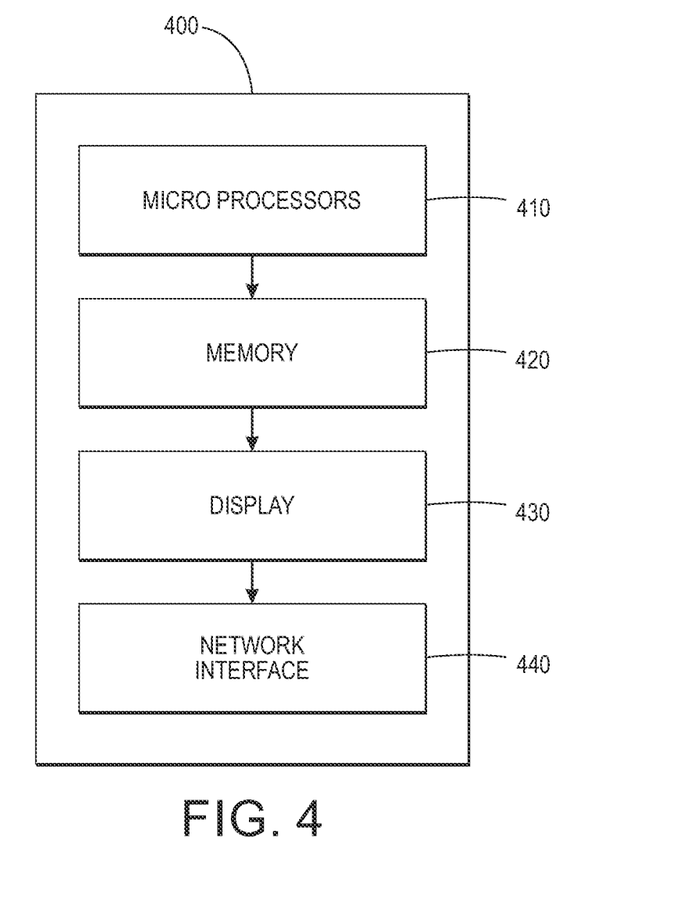
FIG. 4 is a diagram depicting an exemplary computing device capable of utilizing mobile print technologies, consistent with certain disclosed embodiments

FIG. 4 is a diagram depicting an exemplary computing device capable of utilizing mobile print technologies, consistent with certain disclosed embodiments. Computing device 400 may represent any type of one or more computing devices able to output to display 430 and communicate with peripheral devices via network interface 440. For example, computing device 400 can be device 100 from FIG. 1 and/or device 300A from FIG. 3A. In embodiments, display 430 can represent any type of one or more visual output devices capable of presenting data in visual form. For example, display 430 can be an LCD screen. Additionally, in some embodiments, display 430 can be integrated with computing device 400, while, in further embodiments, display 430 can be a separate device capable of sending information to and/or receiving information from computing device 400.

Computing device 400 may include, for example, one or more microprocessors 410 of varying core configurations and clock frequencies; one or more memory devices or computer-readable media 420 of varying physical dimensions and storage capacities, such as flash drives, hard drives, random access memory, etc., for storing data, such as images, files, and program instructions for execution by one or more microprocessors 410; one or more transmitters for communicating over network protocols, such as Ethernet, code divisional multiple access (CDMA), time division multiple access (TDMA); etc. One or more microprocessors 410 and one or more memory devices or computer-readable media 420 may be part of a single device as disclosed in FIG. 4 or may be contained within multiple devices. Those skilled in the art will appreciate that the above-described componentry is exemplary only, as computing device 400 may comprise any type of hardware componentry, including any necessary accompanying firmware or software, for performing the disclosed embodiments. Further, computing device 400 can include, for example, network interface 440. Computing device 400 can communicate with one or more peripheral devices via network interface 440.

The foregoing description of the present disclosure, along with its associated embodiments, has been presented for purposes of illustration only. It is not exhaustive and does not limit the present disclosure to the precise form disclosed. Those skilled in the art will appreciate from the foregoing description that modifications and variations are possible in light of the above teachings or may be acquired from practicing the disclosed embodiments. The steps described need not be performed in the same sequence discussed or with the same degree of separation. Likewise, various steps may be omitted, repeated, or combined, as necessary, to achieve the same or similar objectives or enhancements. Accordingly, the present disclosure is not limited to the above-described embodiments, but instead is defined by the appended claims in light of their full scope of equivalents.

What is claimed is:

1. A method of locating peripheral devices, the method comprising:
   receiving a request to perform a task using a peripheral device;
   determining a current location of a computing device using one or more processors;

searching a database for one or more peripheral devices based on the current location of the computing device, wherein the database associates peripheral devices with known locations, wherein the database further associates peripheral devices with a use counter, and the use counter associated with the selected peripheral devices is incremented based on the receiving the selected peripheral device of the one or more peripheral devices from the user;

displaying, using a peripheral device finder application, at the computing device, a list of the one or more peripheral devices sorted based on a recommendation score, the list of the one or more peripheral devices comprising the one more peripheral devices with its associated use counter, wherein the recommendation score is calculated based on information comprising:

distance of the one or more peripheral devices from the current location of the computing device;

pricing information associated with the one or more peripheral devices;

pricing information associated with using special features associated with the one or more peripheral devices;

a size of the task;

a use count of the one or more peripheral devices by users of the peripheral device finder application; and a use count of the one or more peripheral devices by all types of users;

receiving, from the user, a selection of a new peripheral device that is not associated with the database;

associating the new peripheral device with the current location of the computing device in the database based on receiving the selection of the new peripheral device from the user; and transmitting information to the new peripheral device.

2. The method of claim 1, wherein the current location of the computing device is determined using a GPS receiver.

3. The method of claim 1, further comprising connecting to a wide area network access point, wherein the current location of the computing device is determined using:

a known location of the wide area network access point; and an estimated range of the wide area network access point.

4. The method of claim 1, wherein the one or more peripheral devices comprise one or more printers.

5. The method of claim 1, wherein the searching for the one or more peripheral devices based on the current location of the computing device comprises searching for the one or more peripheral devices based on a predetermined distance from the current location of the computing device.

6. The method of claim 1, wherein the database further associates peripheral devices with pricing information.

7. The method of claim 1, wherein the database further associates peripheral devices with access hours of the peripheral devices.

8. The method of claim 1, wherein the displaying the list of the one or more peripheral devices sorted based on the recommendation score comprises displaying an indication that a peripheral device of the one or more peripheral devices is recommended based on a determination that the peripheral device receive a highest recommendation score.

9. A system for locating peripheral devices comprising:

a processing system comprising one or more processors; and a memory system comprising one or more computer-readable media, wherein the one or more computer-readable media contain instructions that, when executed by the processing system, cause the processing system to perform operations comprising:

receiving a request to perform a task using a peripheral device;

determining a current location of a computing device using one or more processors;

searching a database for one or more peripheral devices based on the current location of the computing device, wherein the database associates peripheral devices with known locations, wherein the database further associates peripheral devices with a use counter, and the use counter associated with the selected peripheral devices is incremented based on the receiving the selected peripheral device of the one or more peripheral devices from the user;

displaying, using a peripheral device finder application, at the computing device, a list of the one or more peripheral devices sorted based on a recommendation score, the list of the one or more peripheral devices comprising the one more peripheral devices with its associated use counter, wherein the recommendation score is calculated based on information comprising:

distance of the one or more peripheral devices from the current location of the computing device;

pricing information associated with the one or more peripheral devices;

pricing information associated with using special features associated with the one or more peripheral devices;

a size of the task;

a use count of the one or more peripheral devices by users of the peripheral device finder application; and a use count of the one or more peripheral devices by all types of users;

receiving, from the user, a selection of a new peripheral device that is not associated with the database;

associating the new peripheral device with the current location of the computing device in the database based on receiving the selection of the new peripheral device from the user; and transmitting information to the new peripheral device.

10. The system of claim 9, wherein the current location of the computing device is determined using a GPS receiver.

11. The system of claim 9, wherein the processing system further performs operations comprising connecting to a wide area network access point, wherein the current location of the computing device is determined using:

a known location of the wide area network access point; and an estimated range of the wide area network access point.

12. The system of claim 9, wherein the one or more peripheral devices comprise one or more printers.

13. The system of claim 9, wherein the searching for the one or more peripheral devices based on the current location of the computing device comprises searching for the one or more peripheral devices based on a predetermined distance from the current location of the computing device.

14. The system of claim 9, wherein the database further associates peripheral devices with pricing information.

15. The system of claim 9, wherein the database further associates peripheral devices with access hours of the peripheral devices.

16. The system of claim 9, wherein the displaying the list of the one or more peripheral devices sorted based on the recommendation score comprises displaying an indication that a peripheral device of the one or more peripheral devices is recommended based on a determination that the peripheral device receive a highest recommendation score.

\* \* \* \* \*